US011130558B2

(12) United States Patent
Wood et al.

(10) Patent No.: US 11,130,558 B2
(45) Date of Patent: Sep. 28, 2021

(54) COMPARTMENTAL BARRIER WITH DECOMPRESSION PANELS

(71) Applicant: AMSAFE Bridport Limited, Bridport (GB)

(72) Inventors: John Wood, Bridport (GB); Tim Pollock, Bridport (GB)

(73) Assignee: AMSAFE BRIDPORT LIMITED, Bridport (GB)

(*) Notice: Subject to any disclaimer, the term of this patent is extended or adjusted under 35 U.S.C. 154(b) by 39 days.

(21) Appl. No.: 15/984,051

(22) Filed: May 18, 2018

(65) Prior Publication Data
US 2019/0367146 A1    Dec. 5, 2019

(30) Foreign Application Priority Data

May 19, 2017    (GB) .................................... 1708086

(51) Int. Cl.
*B64C 1/10*    (2006.01)
*B64C 1/00*    (2006.01)

(52) U.S. Cl.
CPC .......... *B64C 1/10* (2013.01); *B64C 2001/009* (2013.01)

(58) Field of Classification Search
CPC ....... B64C 1/10; B64C 1/14; B64C 2001/009; B65D 90/36
See application file for complete search history.

(56) References Cited

U.S. PATENT DOCUMENTS

| 3,938,764 A | 2/1976 | McIntyre et al. |
| 4,049,221 A * | 9/1977 | Fountain .................. B64C 1/18 244/118.1 |
| 4,498,261 A * | 2/1985 | Wilson .................. F16K 17/162 220/89.2 |
| 4,612,739 A | 9/1986 | Wilson |

(Continued)

FOREIGN PATENT DOCUMENTS

| DE | 1020 11015708 A1 | 10/2012 |
| EP | 2292956 A1 | 3/2011 |
| WO | 2004/079110 A2 | 9/2004 |

OTHER PUBLICATIONS

Oct. 27, 2017 Search Report issued in GB Patent Application No. GB1708086.2.

(Continued)

*Primary Examiner* — Benjamin P Lee
(74) *Attorney, Agent, or Firm* — Oliff PLC

(57) ABSTRACT

A barrier for providing isolation between two internal volumes within an aircraft, comprises: a wall section adapted for location within an aircraft, the wall section having an aperture formed therein; mounting means located on the wall section proximate the aperture; and a substantially planar burst panel member having first and second opposingly-facing sides, the burst panel member adapted for location within the mounting means and dimensioned so as to overlie the aperture when received by the mounting means; the burst panel member comprising a line of weakness provided therein, adapted such that, in use, exposure of the burst panel member to an atmospheric pressure differential between air volumes respectively adjacent the first and second sides exceeding a predetermined value causes the burst panel member to rupture along said line of weakness.

16 Claims, 3 Drawing Sheets

(56) References Cited

U.S. PATENT DOCUMENTS

| | | | |
|---|---|---|---|
| 4,777,974 A * | 10/1988 | Swift | F16K 17/162 137/14 |
| 4,821,909 A * | 4/1989 | Hibler | B65D 90/36 220/203.08 |
| 4,899,960 A | 2/1990 | Hararat-Tehrani et al. | |
| 5,036,632 A * | 8/1991 | Short, III | B65D 90/36 52/1 |
| 5,069,401 A * | 12/1991 | Shepherd | B64C 1/18 160/329 |
| 5,085,017 A * | 2/1992 | Hararat-Tehrani | B64C 1/18 244/118.5 |
| 5,871,178 A | 2/1999 | Barnett et al. | |
| 6,264,141 B1 | 7/2001 | Shim et al. | |
| 6,367,203 B1 * | 4/2002 | Graham | B65D 90/36 137/70 |
| 6,435,455 B1 * | 8/2002 | Holman | B64C 1/10 244/118.5 |
| 6,607,003 B1 * | 8/2003 | Wilson | F16K 17/16 137/68.23 |
| 8,240,604 B2 | 8/2012 | Opp et al. | |
| 8,714,483 B2 * | 5/2014 | Hoetzeldt | B64C 1/18 244/118.5 |
| 2003/0066930 A1 * | 4/2003 | Pratt | E05B 51/023 244/118.5 |
| 2003/0127563 A1 * | 7/2003 | LaConte | B64C 1/1423 244/129.1 |
| 2004/0172889 A1 | 9/2004 | Eijkelenberg et al. | |
| 2005/0103786 A1 * | 5/2005 | Eijkelenberg | B65D 90/36 220/89.2 |
| 2011/0139931 A1 * | 6/2011 | Opp | B64C 1/18 244/121 |
| 2011/0303665 A1 * | 12/2011 | Wilson | B65D 90/36 220/89.1 |
| 2012/0234973 A1 | 9/2012 | Hoetzeldt et al. | |
| 2013/0206909 A1 | 8/2013 | Pamminger et al. | |
| 2013/0340954 A1 | 12/2013 | Kauffman | |
| 2015/0225068 A1 * | 8/2015 | Boyer | B64C 1/18 244/118.1 |
| 2015/0321744 A1 * | 11/2015 | Vetter | B64C 1/34 244/118.5 |
| 2019/0144098 A1 * | 5/2019 | Gallagher, Jr. | E05C 19/001 244/118.5 |

OTHER PUBLICATIONS

Jul. 18, 2018 extended Search Report issued in European Patent Application No. 18171840.4.
Dec. 9, 2019 Office Action issued in European Patent Application No. 18171840.4.

* cited by examiner

COMPARTMENTAL BARRIER WITH DECOMPRESSION PANELS

CROSS-REFERENCE TO RELATED APPLICATIONS

This application claims priority to Great Britain Patent Application No. GB1708086.2, filed May 19, 2017, the disclosure of which is incorporated by reference herein.

TECHNICAL FIELD

This disclosure relates generally to aircraft construction, and more specifically to methods and systems for providing a barrier for isolation between two internal volumes within an aircraft.

BACKGROUND

Within an aircraft fuselage, the crew/passenger compartment may be environmentally isolated from the cargo compartment so as to provide smoke or flame isolation, thereby reducing smoke or flame dispersion within the fuselage of the aircraft. The environmental isolation of the crew/passenger compartment from the cargo compartment may however be complicated by the cabin pressure differences between the crew/passenger compartment and the cargo compartment. In this regard, some aircraft include a frame or other structural member positioned between the cargo compartment and the crew/passenger compartment for supporting a barrier that extends between the compartments. As the frame or other structural members must be capable of carrying the loads created by the differential pressure between the crew/passenger compartment and the cargo compartment under normal operating conditions, the frame or other structural members may be structurally substantial, thereby adding to the cost and weight of the aircraft.

In addition to compensating for pressure variations between the crew/passenger compartment and the cargo compartment, environmental isolation techniques must also account for rapid decompression events and, as such, aircraft may include integral venting systems.

Various "venting" systems for aircraft are known from: US-A1-20120234973, DE-A1-102011015708, US-A-4899960, US-A-5871178, US-B2-8240604 and US-A1-2013/0340954. These generally show the use of decompression panels, caused to open at certain pressure differentials.

However, these known systems all suffer from low accuracy. That is to say, the systems are not finely tuned or calibrated to be reliably activated at specific threshold pressures. This results in a high potential for malfunction. In addition, the pressure differential at which such integral decompression panels are caused to open may be dependent on friction which may, in turn, vary over time and from installation to installation, such as in response to material properties, dirt, debris or the like.

SUMMARY

In some embodiments, the disclosure provides a light weight system for environmentally isolating various spaces from one another in order to provide for flame, smoke or other particulate isolation, while providing protection against decompression events, which overcomes the problems associated with known venting systems.

In some embodiments, the system may include an isolation barrier with at least one "burst" panel configured to fail at a predetermined pressure differential. The burst panels may exhibit a precise performance during a rapid decompression event due to being calibrated, to be activated at specific threshold pressures.

In some embodiments, the disclosure describes a system in which an area of an aircraft, such as a cargo compartment for example, can be environmentally isolated from the crew/passenger compartment of the aircraft. In particular, the system may include a flexible textile (e.g. fabric) barrier for fire, smoke or fume isolation including one or more burst panel that can be deployed in an aircraft interior.

By environmentally isolating the volume, dispersion of smoke or flame is limited. The system may be configured to environmentally isolate the volume in a manner that compensates for pressure variations, such as pressure variations between the cargo compartment and the passenger compartment of an aircraft. Additionally, the system may accommodate decompression events, enabling isolation to at least partially be maintained even where there is a marked pressure drop in at least one of the internal volumes.

In some embodiments, a flexible barrier may be provided that separates an internal volume of the aircraft, the barrier including one or more panels configured to fail at predetermined pressure differential values, thereby permitting a predetermined flow of air through the barrier during a decompression event. The panels provide an environmental seal and also accommodate decompression events without being affected by dirt, debris or the like. The panels are designed to vent at pressures above that of 'normal' operational pressure variations. They are of a non-fragmentation design and thus no other isolation device is required to retain ruptured components.

In accordance with a one embodiment, there is provided a barrier for providing isolation between two internal volumes within an aircraft, comprising: a wall section adapted for location within an aircraft, the wall section having an aperture formed therein; mounting means located on the wall section proximate the aperture; and a substantially planar burst panel member having first and second opposingly-facing sides, the burst panel member adapted for location within the mounting means and dimensioned so as to overlie the aperture when received by the mounting means; the burst panel member comprising a line of weakness provided therein, adapted such that, in use, exposure of the burst panel member to an atmospheric pressure differential between air volumes respectively adjacent the first and second sides exceeding a predetermined value causes the burst panel member to rupture along said line of weakness.

In accordance with another embodiment, there is provided a method for providing isolation between two internal volumes within an aircraft, the method comprising the step of: providing a barrier for location within the aircraft, the barrier comprising: a wall section, the wall section having an aperture formed therein; mounting means located on the wall section proximate the aperture; and a substantially planar burst panel member having first and second opposingly-facing sides, the burst panel member adapted for location within the mounting means and dimensioned so as to overlie the aperture when received by the mounting means; the burst panel member comprising a line of weakness provided therein, adapted such that, in use, exposure of the burst panel member to an atmospheric pressure differential between air volumes respectively adjacent the first and second sides exceeding a predetermined value causes the burst panel member to rupture along said line of weakness.

BRIEF DESCRIPTION OF THE DRAWINGS

Non-limiting and non-exhaustive embodiments are described in reference to the following drawings. In the drawings, like reference numerals refer to like parts through all the various figures unless otherwise specified.

For a better understanding of the present disclosure, a reference will be made to the following detailed description, which is to be read in association with the accompanying drawings, wherein.

DETAILED DESCRIPTION

Figure 1:
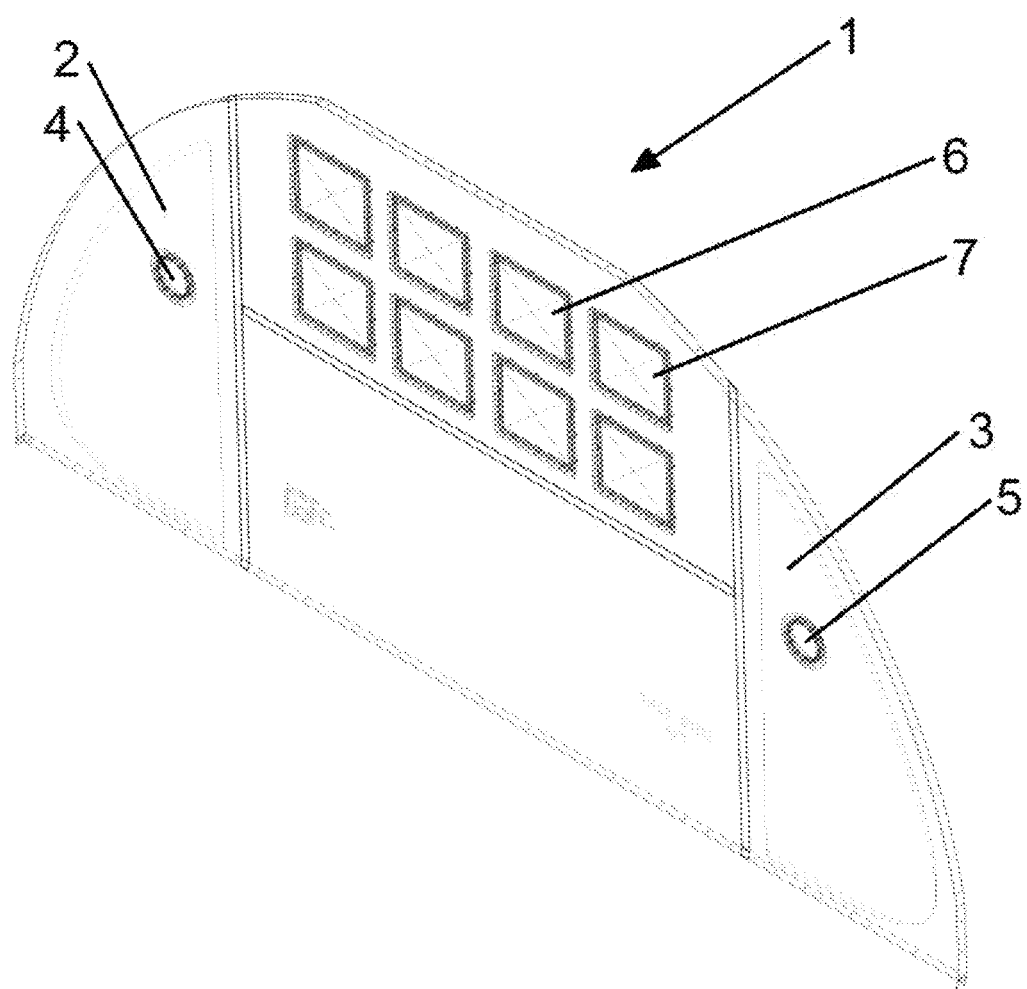
FIG. 1 schematically shows a perspective view of a barrier in accordance with an embodiment of the present invention.

An embodiment is schematically shown in FIG. 1. Here, a smoke barrier 1 may be provided which may be used to divide an aircraft main body into cargo/passenger compartments (passenger to freighter conversions) thus dividing up what was previously one compartment. In some embodiments, the barrier 1 may take the form of a flexible textile barrier, which may be tightly secured and sealed with the interior of the compartment, which may be by using various fastener types, to provide isolation, to create a wall section. Doors 2, 3 are provided port and starboard, which may be closeable by zippers, enabling passage through the barrier when required. View ports 4, 5 may be provided to enable viewing of the cargo compartment without opening the barrier 1.

The wall section may also include a plurality of apertures covered by decompression or burst panels (two of which are indicated at 6 and 7) as will be described in more detail below.

In use, the burst panels may each be attached to the wall section over a respective aperture to provide a smoke seal and ease of replacement (if damaged). The attachment may be effected by a mounting means, described in more detail below.

Figure 2:
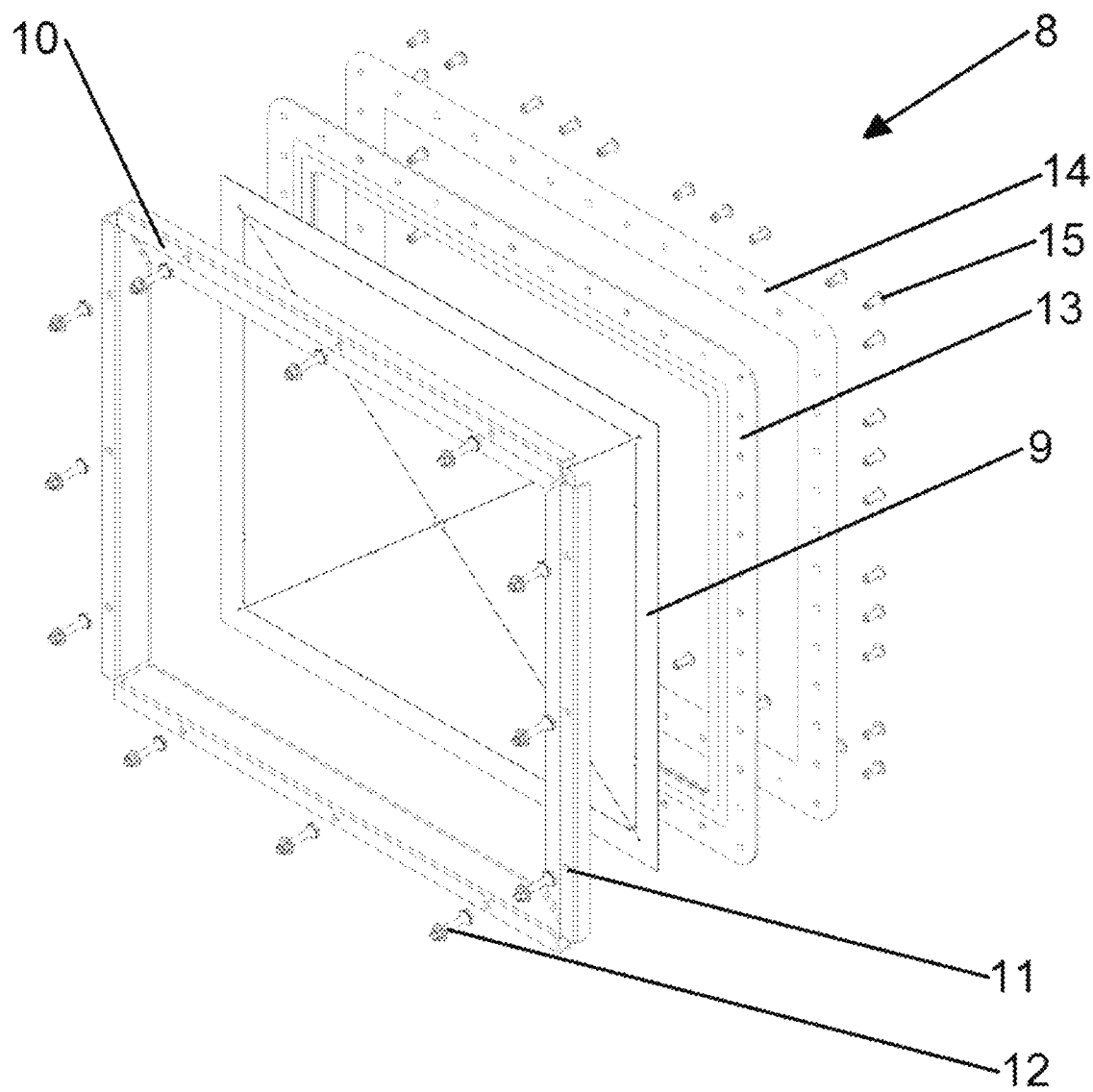
FIG. 2 schematically shows an exploded perspective view of a burst panel for use in a barrier in accordance with the present invention.

FIG. 2 schematically shows a burst panel 8 as it would be fitted to the wall section. The panel 8 comprises a substantially planar burst panel member 9, with means provided around its periphery to enable mounting to a mounting means. Exemplary dimensions for the burst panel member 9 are 390 mm by 345 mm. The panel 8 may comprise a frame 10 having a plurality of spaced apart holes (one indicated at 11) to perform this function. These allow attachment and registration with the mounting means by means of screws, pins, bolts or the like. In the embodiment of FIG. 2, bolts are used (one indicated at 12).

A bidirectional burst panel, which may rupture at the predetermined pressure differential value whichever side is exposed to the greater atmospheric pressure volume, may be constructed, for example by etching lines of weakness on both sides of the panel.

Alternatively, burst panels may be manufactured to rupture in one direction only, i.e. so that the panel will only rupture in response to a pressure differential at the predetermined value where the atmospheric pressure of the volume on one side of the panel is greater than on the other side of the panel—this being termed a unidirectional panel. This may be achieved by bowing the panel slightly.

The burst panel member 9 may be formed of any suitable materials, for example stainless steel and aluminium or exfoliated graphite. Of these, exfoliated graphite may be used as the burst panel member as it experiences less corrosion than aluminium. In one embodiment, two stainless steel sheets sandwich the exfoliated graphite burst panel member.

Two similar frames 13, 14 may be provided of substantially rectangular form, with spaced holes formed therein. Nine of the holes correspond in position to the holes in frame 10, such that bolts may be passed through frame 10 and the frames 13 and 14 to clamp the three components together with the burst panel member 9 held firmly between frame 10 and frame 13. Frames 10, 13 and 14 may be formed of aluminum.

In use, each frame 13, 14 may be placed on a respective side of the wall section, around an aperture. The burst panel member 9 may be fixed to the frames 13, 14 by frame 10 and bolts 12, and the two frames 13, 14 may be riveted together by passing rivets (one indicated at 15) through holes in the frames 13, 14 and corresponding holes in the wall section. This construction achieves a secure smoke seal and ensures the structural integrity of the barrier. In order to improve the seal, a silicone layer may be included at the periphery of the burst panel member 9 to form an air tight seal with frames 10, 13 and 14. Replacement of a burst panel 8 may be achieved simply by the independent removal of the frame 10 and burst panel member 9, leaving the frames 13, 14 in place around the aperture so as not to disturb the structural integrity and textile seal.

Figure 3:
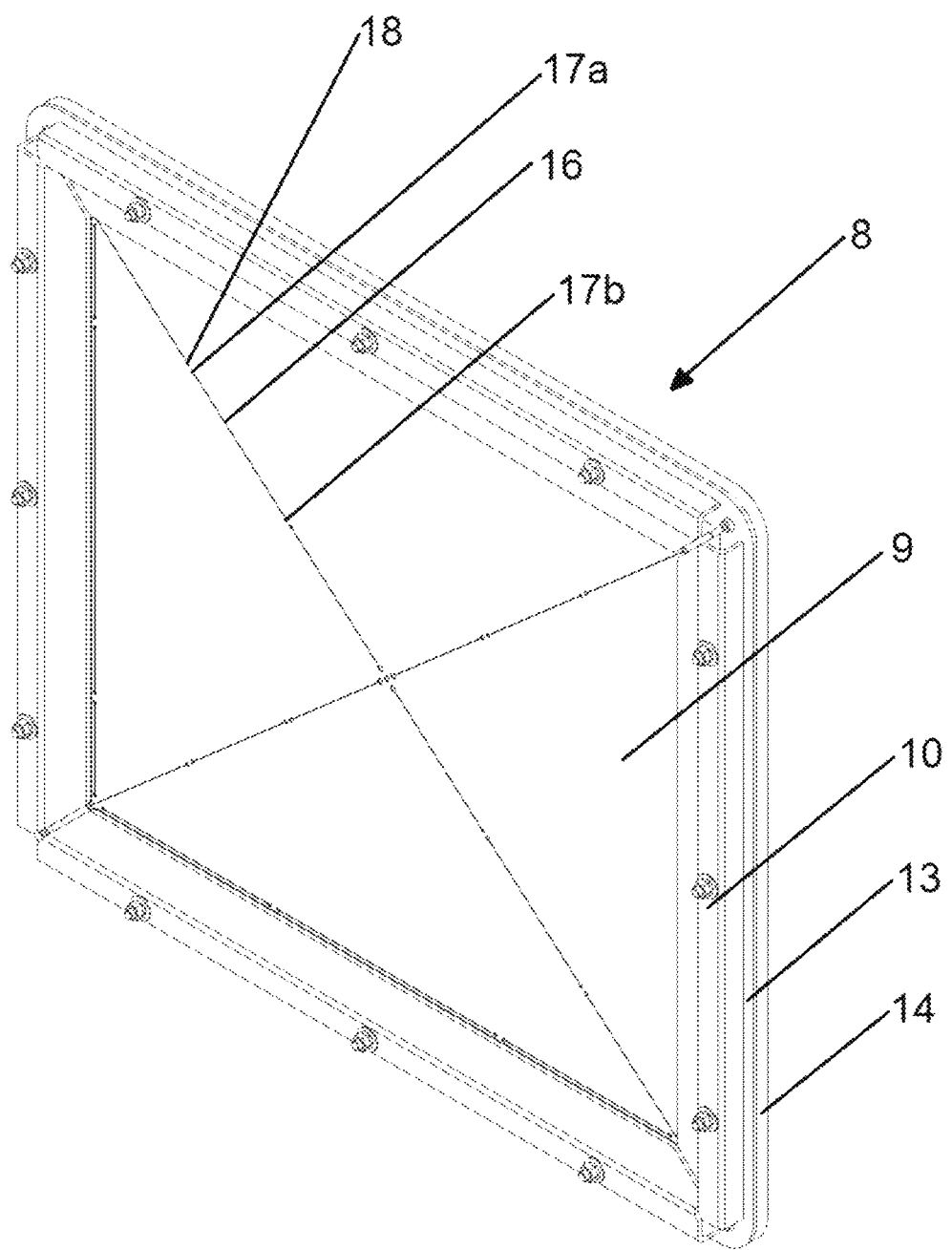
FIG. 3 schematically shows a perspective view of the burst panel of FIG. 2 in a fully assembled state.

A fully assembled burst panel 8 is shown in FIG. 3. The upper surface of the burst panel member 9 as shown includes a plurality of lines of weakness (one indicated at 16), in the form of an "X", which extends across the majority of the surface, which may be formed by etching or scoring the panel. The depth of etching/scoring can be selected so as to control and predetermine the pressure differential value between the upper and lower sides of the panel at which the panel ruptures along the line of weakness. The lines of weakness can be cut entirely through the panel, or can extend partially into the surface. Each line of weakness terminates in a pair of holes (indicated at 17a and 17b for the line of weakness 16). Exemplary dimensions for these holes are 1 mm in diameter. For adjacent lines of weakness the unscored/unetched portion between the two adjacent holes (e.g. between hole 17a and hole 18) forms a bridge. The cross-sectional area of these bridges may determine an amount of air pressure necessary to activate the burst panel member. Exemplary dimensions for the bridges is 0.5 mm×0.19 mm.

When activated, the burst panel member 9 may open to form four triangular sections held at their longest sides to the frames 10, 13, 14 along respective hinge lines.

The exemplary dimensions given above with respect to FIGS. 2 and 3 produce a bidirectional burst panel configured to activate in a range of 0.2 pounds per square inch (1378.95 Pascal) to 0.35 pounds per square inch (2413.165 Pascal), and which will prevent smoke penetration up to 0.133 pounds per square inch (917 Pascal), but other dimensions are contemplated.

There are various ways in which the burst panels may be provided. For example, with the barrier of FIG. 1, the two burst panels indicated at 6 and 7 could be unidirectional, and may be arranged in opposing directions of rupture, so that a pressure differential across the barrier in either direction will cause rupture, as long as it reaches the predetermined value. With this arrangement, in one embodiment, different predetermined values could be implemented for each burst panel, i.e. so that the pressure differential required to rupture a first panel in one direction will be less than the pressure differential required to rupture the second panel in the opposite direction. Of course, this may not be necessary in all circumstances, and so identical burst panels could alternatively be used.

In other embodiments, at least one of the burst panels could be bidirectional.

In yet further embodiments, the number and/or shape and/or position of apertures in the wall section may be varied. For example, particularly if a bidirectional burst panel is used, only one aperture need be provided.

The above-described embodiments are exemplary only, and other possibilities and alternatives within the scope of the invention will be apparent to those skilled in the art. For example, while lines of weakness forming an "X" have been shown in the accompanying Figures, lines of weakness forming a substantially "C"-shaped form could also be used. In this case, instead of four triangular sections held at their longest sides to the frames 10, 13, 14 along respective hinge lines, the activated burst panel member would be held to the frame along a single hinge line. In practice, this has been found to be less advantageous than the "X" shaped embodiment, as the flap for the "C"-shaped form extends further from the isolation barrier, and so a greater area of the aircraft either side of the barrier needs to remain empty to allow space for the flap to extend.

Additionally, while a plurality of lines of weakness are described in the above embodiments, in the limit a single line of weakness could be used.

In any of the above configurations, one or more stiffening rib could be located on the burst panel member to provide more structural stability. These could be, for example, formed, glued or bonded to the burst panel member.

While the above described embodiments have made reference to dividing an interior volume of an aircraft itself, a barrier according to the present invention could equally be used to divide two internal sub-volumes of an area within an aircraft. For example, an item of cargo within the hold of an aircraft could include a barrier according to the present invention dividing an interior volume of the cargo itself.

Different lines of weakness could have different directionalities and/or predetermined values associated with them. Although this type of burst panel is more complex than those described with reference to FIG. 2 for example, with these designs it is possible to reduce the number of apertures, and hence mounting means, required in the barrier. Any combination of the various burst panels may be used.

The foregoing description and drawings merely explain and illustrate the invention and the invention is not limited thereto. While the specification is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. To those skilled in the art, the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

The invention claimed is:

1. A barrier for providing isolation between two internal volumes within an aircraft, the barrier comprising:

a wall section adapted for location within an aircraft, the wall section having an aperture formed therein;

mounting means located on the wall section proximate the aperture; and a substantially planar burst panel member having first and second opposingly-facing sides, the burst panel member adapted for location within the mounting means and dimensioned so as to overlie the aperture when received by the mounting means;

wherein the burst panel member comprises a plurality of lines of weakness provided therein, the plurality of lines of weakness being adapted such that exposure of the burst panel member to an atmospheric pressure differential between air volumes respectively adjacent the first and second sides exceeding a predetermined value causes the burst panel member to rupture along the lines of weakness; and wherein the plurality of lines of weakness of the burst panel member comprise (i) a first plurality of spatially-separated lines of weakness on a first side of a center of the burst panel member and (ii) a second plurality of spatially-separated lines of weakness on a second, opposite side of the center of the burst panel member, the first and second pluralities of spatially-separated lines of weakness being co-linear so as to extend along a single virtual line.

2. A barrier according to claim 1, wherein the plurality of lines of weakness are adapted to rupture when atmospheric pressure of the air volume adjacent the first side exceeds that of the air volume adjacent the second side by the predetermined value, but to remain intact when the atmospheric pressure of the air volume adjacent the second side exceeds that of the air volume adjacent the first side by the predetermined value.

3. A barrier according to claim 1, wherein the plurality of lines of weakness are adapted to rupture when atmospheric pressure of the air volume adjacent the second side exceeds that of the air volume adjacent the first side by the predetermined value, but to remain intact when the atmospheric pressure of the air volume adjacent the first side exceeds that of the air volume adjacent the second side by the predetermined value.

4. A barrier according to claim 1, wherein the lino plurality of lines of weakness are adapted to rupture when atmospheric pressure of the air volume adjacent either of the first and second sides exceeds that of the air volume adjacent the other side by the predetermined value.

5. A barrier according to claim 1, wherein the wall section comprises a plurality of apertures, and each spatially-separated line of weakness is located within the burst panel member so as to overlie a respective aperture when the burst panel member is located within the mounting means.

6. A barrier according to claim 1, wherein each spatially-separated line of weakness is located within the burst panel member so as to overlie the aperture when the burst panel member is located within the mounting means.

7. A barrier according to claim 1, wherein each spatially-separated line of weakness of the burst panel member is adapted to rupture at a different respective predetermined value of atmospheric pressure differential.

8. A barrier according to claim 1, comprising at least one additional wall section aperture, and respective at least one additional mounting means and burst panel member.

9. A barrier according to claim 8, wherein each burst panel member is adapted to rupture at a different predetermined value of atmospheric pressure differential.

10. A barrier according to claim 1, wherein the mounting means is releasable to permit replacement of a burst panel member.

11. A barrier according to claim 1, wherein the wall section is formed of a flexible textile material.

12. A barrier according to claim 1, wherein each line of weakness of the first and second pluralities of spatially-separated lines of weakness terminates in a pair of holes in the burst panel member.

13. A barrier according to claim 12, wherein the burst panel member comprises exfoliated graphite sandwiched between two stainless steel sheets, surfaces of which constitute the first and second opposingly-facing sides of the burst panel member.

14. A method for providing isolation between two internal volumes within an aircraft, the method comprising:
   providing a barrier for location within the aircraft, the barrier comprising:
      a wall section, the wall section having an aperture formed therein;
      mounting means located on the wall section proximate the aperture; and
      a substantially planar burst panel member having first and second opposingly-facing sides, the burst panel member adapted for location within the mounting means and dimensioned so as to overlie the aperture when received by the mounting means;
   wherein the burst panel member comprises a plurality of lines of weakness provided therein, the plurality of lines of weakness being adapted such that exposure of the burst panel member to an atmospheric pressure differential between air volumes respectively adjacent the first and second sides exceeding a predetermined value causes the burst panel member to rupture along the lines of weakness; and
   wherein the plurality of lines of weakness of the burst panel member comprise (i) a first plurality of spatially-separated lines of weakness on a first side of a center of the burst panel member and (ii) a second plurality of spatially-separated lines of weakness on a second, opposite side of the center of the burst panel member, the first and second pluralities of spatially-separated lines of weakness being co-linear so as to extend along a single virtual line.

15. A method according to claim 14, wherein each line of weakness of the first and second pluralities of spatially-separated lines of weakness terminates in a pair of holes in the burst panel member.

16. A method according to claim 15, wherein the burst panel member comprises exfoliated graphite sandwiched between two stainless steel sheets, surfaces of which constitute the first and second opposingly-facing sides of the burst panel member.

* * * * *